(12) United States Patent
Lu et al.

(10) Patent No.: US 9,891,936 B2
(45) Date of Patent: Feb. 13, 2018

(54) METHOD AND APPARATUS FOR PAGE-LEVEL MONITORING

(71) Applicant: Intel Corporation, Santa Clara, CA (US)

(72) Inventors: Jiwei Oliver Lu, Pleasanton, CA (US); Koichi Yamada, Los Gatos, CA (US); James D. Beany, Raleigh, NC (US); Palaniverlrajan Shanmugavelayutham, San Jose, CA (US); Bo Zhang, Raleigh, NC (US)

(73) Assignee: INTEL CORPORATION, Santa Clara, CA (US)

( * ) Notice: Subject to any disclaimer, the term of this patent is extended or adjusted under 35 U.S.C. 154(b) by 237 days.

(21) Appl. No.: 14/039,195

(22) Filed: Sep. 27, 2013

(65) Prior Publication Data

US 2015/0095590 A1    Apr. 2, 2015

(51) Int. Cl.
G06F 12/00 (2006.01)
G06F 9/455 (2006.01)
(Continued)

(52) U.S. Cl.
CPC .......... *G06F 9/4552* (2013.01); *G06F 12/10* (2013.01); *G06F 12/1027* (2013.01); *G06F 2212/682* (2013.01)

(58) Field of Classification Search
None
See application file for complete search history.

(56) References Cited

U.S. PATENT DOCUMENTS 5,345,576 A    9/1994 Lee et al.
5,349,651 A    9/1994 Hetherington et al.
(Continued)

FOREIGN PATENT DOCUMENTS

CN    1178941 A    4/1998
CN    1682181 A    10/2005
(Continued)

OTHER PUBLICATIONS

Japanese Patent Office, Office Action, dated Dec. 4, 2012 in Japanese application No. 2010-262793, 4 pages.
(Continued)

*Primary Examiner* — Baboucarr Faal
(74) *Attorney, Agent, or Firm* — Nicholson De Vos Webster & Elliott LLP

(57) ABSTRACT

An apparatus and method for page level monitoring are described. For example, one embodiment of a method for monitoring memory pages comprises storing information related to each of a plurality of memory pages including an address identifying a location for a monitor variable for each of the plurality of memory pages in a data structure directly accessible only by a software layer operating at or above a first privilege level; detecting virtual-to-physical page mapping consistency changes or other page modifications to a particular memory page for which information is maintained in the data structure; responsively updating the monitor variable to reflect the consistency changes or page modifications; checking a first monitor variable associated with a first memory page prior to execution of first program code; and refraining from executing the first program code if the first monitor variable indicates consistency changes or page modifications to the first memory page.

18 Claims, 14 Drawing Sheets

| Entry# | Valid | V2P Monitor | Write Monitor | Virtual Page Number | Physical Page Number | Context ID | Monitor Variable Address |
|---|---|---|---|---|---|---|---|
| 1 | 1 | 1 (Yes) | 1 (Yes) | 5000 | 200 | 500 | 0x8200 |
| 2 | 0 | 1 (Yes) | 1 (Yes) | 4000 | 300 | 400 | 0x6000 |
| 3 | 1 | 1 (Yes) | 0 (No) | 6000 | 400 | 500 | 0x8204 |
| .. | | | | | | | |
| N | 1 | 1 (Yes) | 1 (Yes) | 7000 | 500 | 500 | 0x8201 |

(51) Int. Cl.
  *G06F 12/10*    (2016.01)
  *G06F 12/1027*  (2016.01)

(56) References Cited

U.S. PATENT DOCUMENTS

| | | | |
|---|---|---|---|
| 5,524,208 A | 6/1996 | Finch et al. | |
| 5,724,565 A | 3/1998 | Dubey et al. | |
| 5,752,272 A | 5/1998 | Tanabe | |
| 5,826,089 A | 10/1998 | Ireton | |
| 5,835,775 A | 11/1998 | Washington et al. | |
| 5,872,987 A | 2/1999 | Wade et al. | |
| 5,890,008 A | 3/1999 | Panwar et al. | |
| 5,926,832 A | 7/1999 | Wing et al. | |
| 5,933,627 A | 8/1999 | Parady | |
| 5,999,734 A | 12/1999 | Willis et al. | |
| 6,016,397 A | 1/2000 | Ogasawara et al. | |
| 6,031,992 A | 2/2000 | Cmelik et al. | |
| 6,077,315 A | 6/2000 | Greenbaum et al. | |
| 6,175,906 B1 * | 1/2001 | Christie | G06F 12/1063 711/144 |
| 6,219,833 B1 | 4/2001 | Solomon et al. | |
| 6,289,506 B1 | 9/2001 | Kwong et al. | |
| 6,327,704 B1 | 12/2001 | Mattson, Jr. et al. | |
| 6,415,379 B1 | 7/2002 | Keppel et al. | |
| 6,430,668 B2 | 8/2002 | Belgard | |
| 6,438,747 B1 | 8/2002 | Schreiber et al. | |
| 6,542,862 B1 | 4/2003 | Safford et al. | |
| 6,615,340 B1 | 9/2003 | Wilmot, II | |
| 6,622,301 B1 | 9/2003 | Hirooka et al. | |
| 6,631,514 B1 | 10/2003 | Le | |
| 6,711,667 B1 | 3/2004 | Ireton | |
| 6,884,171 B2 | 4/2005 | Eck et al. | |
| 6,976,131 B2 | 12/2005 | Pentkovski et al. | |
| 7,010,787 B2 | 3/2006 | Sakai | |
| 7,111,096 B1 | 9/2006 | Banning et al. | |
| 7,178,137 B1 | 2/2007 | Peak et al. | |
| 7,269,825 B1 | 9/2007 | Adcock | |
| 7,290,253 B1 | 10/2007 | Agesen | |
| 7,343,479 B2 | 3/2008 | Knebel et al. | |
| 7,346,902 B2 | 3/2008 | Dutt et al. | |
| 7,350,200 B2 | 3/2008 | Lueh et al. | |
| 7,373,640 B1 | 5/2008 | English et al. | |
| 7,376,800 B1 | 5/2008 | Choquette et al. | |
| 7,446,773 B1 | 11/2008 | Alben et al. | |
| 7,466,316 B1 | 12/2008 | Alben et al. | |
| 7,503,039 B2 | 3/2009 | Inoue et al. | |
| 7,506,217 B2 | 3/2009 | Borin et al. | |
| 7,516,453 B1 | 4/2009 | Bugnion | |
| 7,603,664 B2 | 10/2009 | Dutt et al. | |
| 7,640,399 B1 | 12/2009 | Lepak et al. | |
| 7,644,210 B1 | 1/2010 | Banning et al. | |
| 7,734,895 B1 | 6/2010 | Agarwal et al. | |
| 7,757,221 B2 | 7/2010 | Zheng et al. | |
| 7,765,536 B2 | 7/2010 | Gordy et al. | |
| 7,814,486 B2 | 10/2010 | Papakipos et al. | |
| 7,962,724 B1 | 6/2011 | Ali | |
| 8,127,121 B2 | 2/2012 | Yates, Jr. et al. | |
| 8,136,102 B2 | 3/2012 | Papakipos et al. | |
| 8,146,106 B2 | 3/2012 | Kim et al. | |
| 8,181,168 B1 | 5/2012 | Lee et al. | |
| 8,209,517 B1 | 6/2012 | Rozas et al. | |
| 8,214,808 B2 | 7/2012 | Day et al. | |
| 8,255,882 B2 | 8/2012 | Zhang et al. | |
| 8,296,749 B2 | 10/2012 | Zhao et al. | |
| 8,387,034 B2 | 2/2013 | Gordy et al. | |
| 8,418,179 B2 | 4/2013 | Papakipos et al. | |
| 8,463,589 B2 | 6/2013 | Clark et al. | |
| 8,464,035 B2 | 6/2013 | Dixon et al. | |
| 8,479,176 B2 | 7/2013 | Ottoni et al. | |
| 8,521,944 B2 | 8/2013 | Matas | |
| 8,527,973 B2 | 9/2013 | Little et al. | |
| 8,762,127 B2 | 6/2014 | Winkel et al. | |
| 8,789,031 B2 | 7/2014 | Liu et al. | |
| 8,893,280 B2 | 11/2014 | Jung et al. | |
| 8,909,902 B2 | 12/2014 | Latorre et al. | |
| 8,935,678 B2 | 1/2015 | Wu et al. | |
| 2002/0013892 A1 | 1/2002 | Gorishek, IV et al. | |
| 2002/0045484 A1 | 4/2002 | Eck et al. | |
| 2002/0065992 A1 | 5/2002 | Chauvel et al. | |
| 2002/0156977 A1 | 10/2002 | Derrick et al. | |
| 2003/0014602 A1 | 1/2003 | Shibayama et al. | |
| 2003/0018684 A1 | 1/2003 | Ohsawa et al. | |
| 2003/0172253 A1 | 9/2003 | Balakrishnan et al. | |
| 2003/0221035 A1 | 11/2003 | Adams | |
| 2004/0003309 A1 | 1/2004 | Cai et al. | |
| 2004/0059897 A1 | 3/2004 | Rose et al. | |
| 2004/0073899 A1 | 4/2004 | Luk et al. | |
| 2004/0078779 A1 | 4/2004 | Dutt et al. | |
| 2004/0078780 A1 | 4/2004 | Dutt et al. | |
| 2004/0078785 A1 | 4/2004 | Dutt et al. | |
| 2004/0107335 A1 | 6/2004 | Dua et al. | |
| 2005/0086451 A1 | 4/2005 | Yates, Jr. et al. | |
| 2005/0267996 A1 | 12/2005 | O'Connor et al. | |
| 2005/0273772 A1 | 12/2005 | Matsakis et al. | |
| 2006/0005176 A1 | 1/2006 | Kawahara et al. | |
| 2006/0005179 A1 | 1/2006 | Kawahara et al. | |
| 2006/0064692 A1 | 3/2006 | Sanchez et al. | |
| 2006/0136878 A1 | 6/2006 | Raghunath et al. | |
| 2006/0218432 A1 | 9/2006 | Taskov et al. | |
| 2006/0294326 A1 | 12/2006 | Jacobson et al. | |
| 2006/0294508 A1 | 12/2006 | Berkowits et al. | |
| 2007/0038987 A1 | 2/2007 | Ohara et al. | |
| 2007/0050555 A1 | 3/2007 | Ferren et al. | |
| 2007/0079281 A1 | 4/2007 | Liao et al. | |
| 2007/0079304 A1 | 4/2007 | Zheng et al. | |
| 2007/0169042 A1 | 7/2007 | Janczewski | |
| 2007/0174828 A1 | 7/2007 | O'Brien et al. | |
| 2007/0192545 A1 | 8/2007 | Gara et al. | |
| 2007/0220525 A1 | 9/2007 | State et al. | |
| 2007/0226696 A1 | 9/2007 | Radhakrishnan et al. | |
| 2007/0234315 A1 | 10/2007 | Branda et al. | |
| 2007/0277021 A1 | 11/2007 | O'Connor et al. | |
| 2007/0283100 A1 | 12/2007 | Asano et al. | |
| 2007/0283337 A1 | 12/2007 | Kasahara et al. | |
| 2007/0283357 A1 | 12/2007 | Jeter et al. | |
| 2007/0294680 A1 | 12/2007 | Papakipos et al. | |
| 2007/0294702 A1 | 12/2007 | Melvin et al. | |
| 2008/0010444 A1 | 1/2008 | Hammes | |
| 2008/0134159 A1 | 6/2008 | Guo et al. | |
| 2008/0141012 A1 | 6/2008 | Yehai et al. | |
| 2008/0141268 A1 | 6/2008 | Tirumalai et al. | |
| 2008/0163183 A1 | 7/2008 | Li et al. | |
| 2008/0209389 A1 | 8/2008 | Baumgartner et al. | |
| 2008/0244538 A1 | 10/2008 | Nair et al. | |
| 2008/0263324 A1 | 10/2008 | Sutardja et al. | |
| 2008/0270740 A1 | 10/2008 | Wang et al. | |
| 2008/0294882 A1 | 11/2008 | Jayapala et al. | |
| 2009/0019272 A1 | 1/2009 | Cypher et al. | |
| 2009/0031082 A1 | 1/2009 | Ford et al. | |
| 2009/0037682 A1 * | 2/2009 | Armstrong | G06F 12/1475 711/164 |
| 2009/0064115 A1 | 3/2009 | Sheynin et al. | |
| 2009/0172353 A1 | 7/2009 | Su et al. | |
| 2009/0204785 A1 | 8/2009 | Yates, Jr. et al. | |
| 2009/0217020 A1 | 8/2009 | Yourst | |
| 2009/0222654 A1 | 9/2009 | Hum et al. | |
| 2009/0228657 A1 | 9/2009 | Hagiwara | |
| 2010/0005474 A1 | 1/2010 | Sprangle et al. | |
| 2010/0026812 A1 | 2/2010 | Minatel | |
| 2010/0042981 A1 | 2/2010 | Dreyer et al. | |
| 2010/0050266 A1 | 2/2010 | Cheng et al. | |
| 2010/0070708 A1 | 3/2010 | Maruyama | |
| 2010/0122036 A1 | 5/2010 | Radovic et al. | |
| 2010/0205599 A1 | 8/2010 | Vaidya et al. | |
| 2010/0235611 A1 | 9/2010 | Yamashita | |
| 2010/0262812 A1 | 10/2010 | Lopez et al. | |
| 2010/0269102 A1 | 10/2010 | Latorre et al. | |
| 2010/0274551 A1 | 10/2010 | Das et al. | |
| 2010/0274972 A1 | 10/2010 | Babayan et al. | |
| 2011/0055530 A1 | 3/2011 | Henry et al. | |
| 2011/0067015 A1 | 3/2011 | Takagi et al. | |
| 2011/0119526 A1 | 5/2011 | Blumrich et al. | |
| 2011/0119660 A1 | 5/2011 | Tanaka | |
| 2011/0131372 A1 | 6/2011 | Knippel et al. | |

(56) References Cited

U.S. PATENT DOCUMENTS

| | | | |
|---|---|---|---|
| 2011/0154079 A1 | 6/2011 | Dixon et al. | |
| 2011/0154090 A1 | 6/2011 | Dixon et al. | |
| 2011/0167416 A1 | 7/2011 | Sager et al. | |
| 2011/0225655 A1 | 9/2011 | Niemela et al. | |
| 2011/0238955 A1 | 9/2011 | Nickolls et al. | |
| 2012/0144167 A1 | 6/2012 | Yates, Jr. et al. | |
| 2012/0233378 A1* | 9/2012 | Elteto | G06F 9/45558 711/6 |
| 2012/0239912 A1* | 9/2012 | Maeda | G06F 12/02 712/226 |
| 2013/0086299 A1 | 4/2013 | Epstein | |
| 2013/0185580 A1 | 7/2013 | Dixon et al. | |
| 2013/0262838 A1 | 10/2013 | Al-Otoom et al. | |
| 2013/0268742 A1 | 10/2013 | Yamada et al. | |
| 2013/0305019 A1 | 11/2013 | Caprioli et al. | |
| 2013/0311758 A1 | 11/2013 | Caprioli et al. | |
| 2014/0095832 A1 | 4/2014 | Haber et al. | |
| 2014/0156933 A1 | 6/2014 | Shaikh et al. | |
| 2014/0281376 A1 | 9/2014 | Yamada et al. | |

FOREIGN PATENT DOCUMENTS

| | | |
|---|---|---|
| EP | 1 316 882 A2 | 6/2003 |
| JP | 63-106836 A | 5/1988 |
| JP | 5-081070 A | 4/1993 |
| JP | 8-123697 A | 5/1996 |
| JP | 09-160774 A | 6/1997 |
| JP | 10-097431 A | 4/1998 |
| JP | H10116192 A | 5/1998 |
| JP | 2002-536712 A | 10/2002 |
| JP | 2003-196107 A | 7/2003 |
| JP | 2006-221643 A | 8/2006 |
| JP | 2008-527506 A | 7/2008 |
| JP | 2008-546121 A | 12/2008 |
| KR | 20040022436 A | 3/2004 |
| TW | 201112118 A | 4/2011 |
| TW | 201140435 A | 11/2011 |
| WO | 2013/048468 A1 | 4/2013 |

OTHER PUBLICATIONS

Non-Final Office Action for U.S. Appl. No. 12/646,054, dated Sep. 27, 2013, 34 pages.
German Patent Office, Office Action dated Apr. 17, 2014 in German Application No. 10 2010 053 972.4, 20 pages.
Notice of Allowance for U.S. Appl. No. 14/646,054, dated Mar. 5, 2014, 10 pages.
State Intellectual Property Office (SIPO) of the People's Republic of China, Office Action dated Apr. 3, 2013 in Chinese Application No. 20101060968.1, 17 pages.
Non-Final Office Action for U.S. Appl. No. 13/785,561, dated Sep. 25, 2013, 35 pages.
Notice of Allowance for U.S. Appl. No. 13/785,561, dated Feb. 14, 2014, 16 pages.
International Search Report and Written Opinion dated Mar. 1, 2012, for counterpart International Application No. PCT/US2011/054380.
Non-Final Office Action for U.S. Appl. No. 13/995,400, dated Sep. 17, 2014, 21 pages.
Final Office Action for U.S. Appl. No. 13/995,400, dated Feb. 24, 2015, 22 pages.
Ottoni et al., "Harmonia: A Transparent, Efficient, and Harmonious Dynamic Binary Translator Targeting the Intel Architecture", 2011 ACM, CF'11, May 3-5, 2011, Ischia, Italy, pp. 1-12; <http://dl.acm.org/citation.cfm?doid=2016604.2016635>.
Non-Final Office Action for U.S. Appl. No. 13/995,400, dated Sep. 24, 2015, 32 pages.
Klaiber, A., "Low-Power X86-Compatabile Processors Implemented With Code Morhping Software", Transmeta Corporation, Jan. 2000, 18 pages.

Notice of Allowance for U.S. Appl. No. 13/995,400, dated Apr. 11, 2016, 19 pages.
Office Action received for Taiwan Patent Application No. 101135588, dated Aug. 24, 2015, 9 pages.
Brankovic et al., "Performance Analysis and Predictability of the Software Layer in Dynamic Binary Translators/Optimizers", 2013 ACM, CF'13, May 14-16, 2013, pp. 1-10.
Xu et al., "A Dynamic Binary Translation Framework Based on Page Fault Mechanism in Linux Kernel", 2010 IEEE, CIT'10, Jun. 2010; pp. 2284-2289.
Guan et al., "A Runtime Profile Method for Dynamic Binary Translation Using Hardware-Support Technique", 2009 IEEE, ICISE2009, Dec. 2009; pp. 4683-4687.
Ding-Yong Hong, "Efficient and Retargetable Dynamic Binary Translation", National Tsing Hua University, Apr. 2013; pp. 1-102.
Office Action received for Taiwan Patent Application No. 101135588, dated Feb. 15, 2015, 12 pages.
International Preliminary Report on Patentability and Written Opinion Received for PCT Patent Application No. PCT/US2011/054380, dated Apr. 10, 2014, 5 pages.
Rakesh Kumar et al., Single-ISA Heterogeneous Mutli-Core Architectures: The Potential for Processor Power Reduction, Proceedings of the 36th annual IEEE/ACM International Symposium on Microarchitecture, Dec. 3-5, 2003; 12 total pages.
Theofanis Constantinou et al., Performance Implications of single thread migration on a chip multi-core, ACM SIGARCH Computer Architecture News, v. 33 n.4, Nov. 2005, pp. 80-91.
Non-Final Office Action for U.S. Appl. No. 13/993,042, dated Oct. 26, 2015, 72 pages.
PCT/US2011/067654 Notification of Transmittal of the International Search Report and the Written Opinion of the International Searching Authority, dated Sep. 5, 2012, 6 pages.
PCT/US2011/067654 Notification Concering Transmittal of International Preliminary Report on Patentability, dated Jul. 10, 2014, 6 pages.
Office Action and Search Report with English Translation of Search Report from Taiwan Patent Application No. 101147868, dated Sep. 24, 2014, 46 pages.
Notice of Allowance from Taiwan Patent Application No. 101147868, dated Apr. 21, 2015, 2 pages.
Non-Final Office Action for U.S. Appl. No. 12/978,557, dated Jul. 2, 2015, 16 pages.
Non-Final Office Action for U.S. Appl. No. 12/978,557, dated Nov. 21, 2012, 8 pages.
Final Office Action for U.S. Appl. No. 12/978,557, dated Jul. 16, 2013, 19 pages.
Non-Final Office Action for U.S. Appl. No. 12/978,557, dated Jun. 4, 2014, 17 pages.
Final Office Action for U.S. Appl. No. 12/978,557, dated Jan. 20, 2016, 21 pages.
Non-Final Office Action for U.S. Appl. No. 12/978,557, dated Jun. 10, 2016, 9 pages.
Notice of Allowance for U.S. Appl. No. 12/978,557, dated Sep. 20, 2016, 9 pages.
Final Office Action for U.S. Appl. No. 12/978,557, dated Jan. 5, 2015, 19 pages.
First Office Action and Search Report for foreign counterpart China Application No. 201180062500.2, dated Dec. 3, 2014, 12 pages.
Third Office Action for foreign counterpart China Application No. 201180062500.2, dated Mar. 30, 2016, 10 pages.
Second Office Action for foreign counterpart China Application No. 201180062500.2, dated Sep. 17, 2015, 12 pages.
International Search Report and the Written Opinion of the International Searching Authority for Application No. PCT/US2011/063466, dated Jun. 28, 2012, 10 pages.
International Preliminary Report on Patentability for Application No. PCT/US2011/063466, dated Jun. 25, 2013, 7 pages.
Taiwan Office Action and Search Report for foreign counterpart Taiwan Application No. 100145350, dated Apr. 16, 2014, 7 pages.
Notice of Allowance for foreign counterpart Taiwan Application No. 100145350, dated Nov. 11, 2014, 2 pages.
Office Action for foreign counterpart for Korean Application No. 10-2013-7016446, dated Sep. 22, 2014, 5 pages.

(56) References Cited

OTHER PUBLICATIONS

Notice of Allowance for foreign counterpart Korean Application No. 10-2013-7016446, dated Mar. 30, 2015, 3 pages.
Office Action for foreign counterpart for Japan Application No. 2013-546184, dated Jul. 1, 2014, 2 pages.
Office Action for foreign counterpart for Japan Application No. 2013-546184, dated Jan. 6, 2015, 3 pages.
Notice of Allowance for foreign counterpart for Japan Application No. 2013-546184, dated Aug. 7, 2015, 1 page.
Du, Zhao-Hui, et al., "A Cost-Driven Compilation Framework for Speculative Parallelization of Sequential Programs," in Proceedings of the Conference on Programming Language Design and Implementation, Jun. 2004, pp. 71-81.
Farkas, Keith I, et al., "The Multicluster Architecture: Reducing Cycle Time Through Partitioning," in Intl Symposium on Microarchitecture, Dec. 1997, 11 pages.
Final Office Action from U.S. Appl. No. 12/624,804 dated Nov. 6, 2013, 13 pages.
Final Office Action from U.S. Appl. No. 12/646,815 dated Jul. 18, 2013, 19 pages.
Final Office Action from U.S. Appl. No. 13/533,821 dated Feb. 12, 2015, 27 pages.
Final Office Action from U.S. Appl. No. 13/993,042 dated Mar. 17, 2016, 56 pages.
International Preliminary Report on Patentability for Application No. PCT/US2009/065735 dated May 24, 2011, 7 pages.
Madriles, C., et al., "Boosting Single-thread Performance in Multicore Systems through Fine-Grain Multi-Threading" ISCA, Jun. 20-24, 2009, ACM, 10 pages.
Marcuello, P., et al., "Thread Partitioning and Value Prediction for Exploiting Specutlative Thread-Level Parallelism" IEEE Transactions on Computers, Feb. 2004, vol. 53, No. 2, pp. 114-125.
Nakano, H., "Static Coarse Grain Task Scheduling with Cache Optimization Using OpenMP. International Journal of Parallel Programming" Jun. 2003, vol. 31, No. 3, pp. 211-223.
Non Final Office Action from U.S. Appl. No. 12/624,804 dated Apr. 22, 2013, 15 pages.
Non Final Office Action from U.S. Appl. No. 12/646,815 dated Aug. 23, 2012, 9 pages.
Non Final Office Action from U.S. Appl. No. 12/646,815 dated Nov. 10, 2014, 13 pages.
Non Final Office Action from U.S. Appl. No. 13/533,821 dated Apr. 22, 2014, 13 pages.
Non Final Office Action from U.S. Appl. No. 13/533,821 dated Aug. 21, 2014, 14 pages.
Non-Final Office Action from U.S. Appl. No. 13/993,042 dated Sep. 1, 2016, 53 pages.
Notice of Allowance from foreign counterpart China Patent Application No. 200980139244.5, dated May 30, 2014, 7 pages.
Office Action from foreign counterpart China Patent Application No. 200980139244.5, dated May 9, 2013, 14 pages.
Office Action from foreign counterpart China Patent Application No. 200980139244.5, dated Dec. 19, 2013, 6 pages.
Notice of Allowance from U.S. Appl. No. 12/624,804, dated Apr. 3, 2014, 9 pages.
Notice of Allowance from foreign counterpart Japan Patent Application No. 2011-536625, dated Apr. 9, 2014, 3 pages.
Office Action for foreign counterpart for Japan Application No. 2011-536625, dated Mar. 12, 2013, 9 pages.
Office Action for foreign counterpart for Japan Application No. 2011-536625, dated Oct. 1, 2013, 8 pages.
Notice of Allowance from foreign counterpart Korean Patent Application No. 2011-7007725, dated Apr. 26, 2013, 3 pages.
Office Action from foreign counterpart Korean Patent Application No. 2011-7007725, dated Oct. 12, 2012, 1 page.
Notification of Transmittal of the International Search Report and the Written Opinion of the International Searching Authority, or the Declaration from counterpart PCT/US2009/065735, dated Jul. 8, 2010, 10 pages.
Notification of Transmittal of the International Search Report and the Written Opinion of the International Searching Authority, or the Declaration from counterpart PCT/US2013/043723, dated Jul. 12, 2013, 7 pages.
Notification Concerning Transmittal of International Preliminary Report on Patentability for International Application No. PCT/US2013/043723, dated Jan. 8, 2015, 6 pages.
Notice of Allowance from U.S. Appl. No. 13/533,821 dated Jul. 6, 2015, 11 pages.
Notice of Allowance for U.S. Appl. No. 12/646,815 dated Aug. 12, 2016, 9 pages.
Notice of Allowance from U.S. Appl. No. 12/646,815, dated Feb. 9, 2016, 9 pages.
Notice of Allowance from U.S. Appl. No. 12/646,815, dated Apr. 3, 2015, 9 pages.
Sarkar, V., "Automatic partitioning of a program dependence graph into parallel tasks", IBM Journal of Research and Development, vol. 35. No. 5/6, Sep./Nov. 1991, pp. 779-804.
Advisory Action from U.S. Appl. No. 13/995,400 dated Jul. 28, 2015, 3 pages.
Ferrante, Ottenstein, Warren, "The Program Dependence Graph and Its Use in Optimization," in ACM Transactions on Programming Languages and Systems (TOPLAS), 1987, 31 pages.
Fields, Brian, et al., "Slack: Maximizing Performance Under Technological Constraints," in Procs. of the 29th International Symposium on Computer Architecture, 2002, 12 pages.
Ipek E., et al., "Core Fusion: Accommodating Software Diversity in Chip Multiprocessors," International Symposium on Computer Architecture (ISCA), Jun. 9-13, 2007, 12 pages.
Johnson T.A., et al., "Min-Cut Program Decomposition for Thread-Level Speculation," Proc. of Conference on Programming Language Design and Implementation, 2004, 12 pages.
Karypis, George and Kumar, Vipin, "Analysis of Multilevel Graph Partitioning," in Procs. of 7th Supercomputing Conference, 1995, 19 pages.
Kernighan B.W., et al., "An Efficient Heuristic Procedure for Partitioning Graphs," The Bell System Technical Journal, 1970, pp. 17.
Notice of Allowance from U.S. Appl. No. 12/646,815, dated Jan. 30, 2017, 9 pages.
Notice of Allowance from U.S. Appl. No. 12/978,557, dated Jan. 27, 2017, 16 pages.
Quinones, Carlos Garcia, et al., "Mitosis Compiler: An Infrastructure for Speculative Threading Based on Pre-Computation Slices," Procs. of Conference on Programming Language Design and Implementation, 2005, 11 pages.
Requirement for Restriction/Election from U.S. Appl. No. 14/563,839 dated Oct. 12, 2016, 7 pages.
Final Office Action from U.S. Appl. No. 13/993,042, dated Mar. 10, 2017, 51 pages.
Non-Final Office Action from U.S. Appl. No. 14/563,839, dated Mar. 23, 2017, 18 pages.
Oplinger., et al., "In Search of Speculative Thread-Level Parallelism," Computer Systems Laboratory, Stanford University, IEEE 1999, 11 pages.
Ottoni., et al., "Communication Optimizations for Global Multi-Threaded Instruction Scheduling," ASPLOS'08, Mar. 1-5, 2008, Seattle, WA, 2008 ACM, 11 pages.
Notice of Allowance from U.S. Appl. No. 12/646,815, dated Jun. 7, 2017, 9 pages.
Notice of Allowance from U.S. Appl. No. 12/646,815, dated Sep. 22, 2017, 9 pages.
Prabhu M.K., et al., "Exposing Speculative Thread Parallelism in SPEC 2000," PPoPP'05, Jun. 15-17, 2005, Chicago, Ilinois, U.S.A., 2005 ACM 1-59593-080-9/05/0006; 11 pages.
Steffan, et al., "Improving Value Communication for Thread-Level Speculation," Published in Proceedings of the Eighth Int'l Symposium on High-Performance Computer Architecture (HPCA '02), 2002, 12 pages.
Tullsen D.M., et al., "Simultaneous Multithreading: Maximizing On-Chip Parallelism," Proceedings of the 22nd Annual International Symposium on Computer Architecture, Jun. 1995, pp. 392-403.

(56) References Cited

OTHER PUBLICATIONS

Notification of Reasons for Refusal for foreign counterpart Japan Application No. 2010-262793, dated Sep. 27, 2013, 4 pages.
Decision to Grant a Patent for foreign counterpart Japan Application No. 2010-262793, dated Jan. 17, 2014, 6 pages.
Second Office Action for foreign counterpart China Application No. 201010609068.1, dated Dec. 6, 2013, 13 pages.
Notification to Grant Patent for foreign counterpart China Application No. 201010609068.1, dated Apr. 24, 2015, 3 pages.
Third Office Action for foreign counterpart China Application No. 201010609068.1, dated Aug. 13, 2014, 14 pages.
Notification to Grant Patent for foreign counterpart China Application No. 201180062500.2, dated Dec. 13, 2016, 3 pages.
Fourth Office Action for for foreign counterpart China Application No. 201180062500.2, dated Sep. 29, 2016, 8 pages.
Notice of Allowance from U.S. Appl. No. 12/646,815, dated Sep. 2, 2017, 9 pages.

\* cited by examiner

| Entry# | Valid | V2P Monitor | Write Monitor | Virtual Page Number | Physical Page Number | Context ID | Monitor Variable Address |
|---|---|---|---|---|---|---|---|
| 1 | 1 | 1 (Yes) | 1 (Yes) | 5000 | 200 | 500 | 0x8200 |
| 2 | 0 | 1 (Yes) | 1 (Yes) | 4000 | 300 | 400 | 0x6000 |
| 3 | 1 | 1 (Yes) | 0 (No) | 6000 | 400 | 500 | 0x8204 |
| : |  |  |  |  |  |  |  |
| N | 1 | 1 (Yes) | 1 (Yes) | 7000 | 500 | 500 | 0x8201 |

*Fig. 9*

METHOD AND APPARATUS FOR PAGE-LEVEL MONITORING

BACKGROUND

Field of the Invention

This invention relates generally to the field of computer processors and software. More particularly, the invention relates to an apparatus and method for page level monitoring.

Description of the Related Art

In current binary translation implementations, the binary translation software is loaded from persistent storage such as the platform flash read only memory (ROM) into a predefined area in the system random access memory (RAM). The dynamically translated binary code is then stored in a part of the remaining system RAM, called the "Translation Cache." The rest of the remaining memory is available for native software (e.g., x86) including the basic input output system (BIOS), operating system (OS) and applications.

Current hardware/software co-designed binary translation platforms enable dynamic binary optimizations through hidden binary translation (BT) software. Such software delivers increased performance in a power efficient fashion and also enables new instruction set architecture (ISA) extensions transparent to the OS and applications. One of the challenges of current binary translation systems is the detection of translation consistency violations occurring due to the following causes:

(1) the virtual page, where the original instruction stream resides, has been remapped to a different physical page which has different instruction stream contents;

(2) the original instruction stream has been modified by the current processor (e.g., via Self-Modifying Code) or remote processors (e.g., via Cross Modifying Code); and (3) direct memory access (DMA) devices modify the original instruction streams.

Addressing the above issues often results in investing a very complex, dedicated, and expensive processor as well as new ISA extensions. While it is possible for new processor architectures to take such an aggressive step, it may be difficult or impractical for existing matured micro-architectures to do the same.

BRIEF DESCRIPTION OF THE DRAWINGS

A better understanding of the present invention can be obtained from the following detailed description in conjunction with the following drawings, in which:

FIG. 9 illustrates one embodiment of a PCLB;

DETAILED DESCRIPTION

In the following description, for the purposes of explanation, numerous specific details are set forth in order to provide a thorough understanding of the embodiments described below. It will be apparent, however, to one skilled in the art that the embodiments may be practiced without some of these specific details. In other instances, well-known structures and devices are shown in block diagram form to avoid obscuring the underlying principles of the embodiments.

Exemplary Processor Architectures and Data Types

Figure 1:
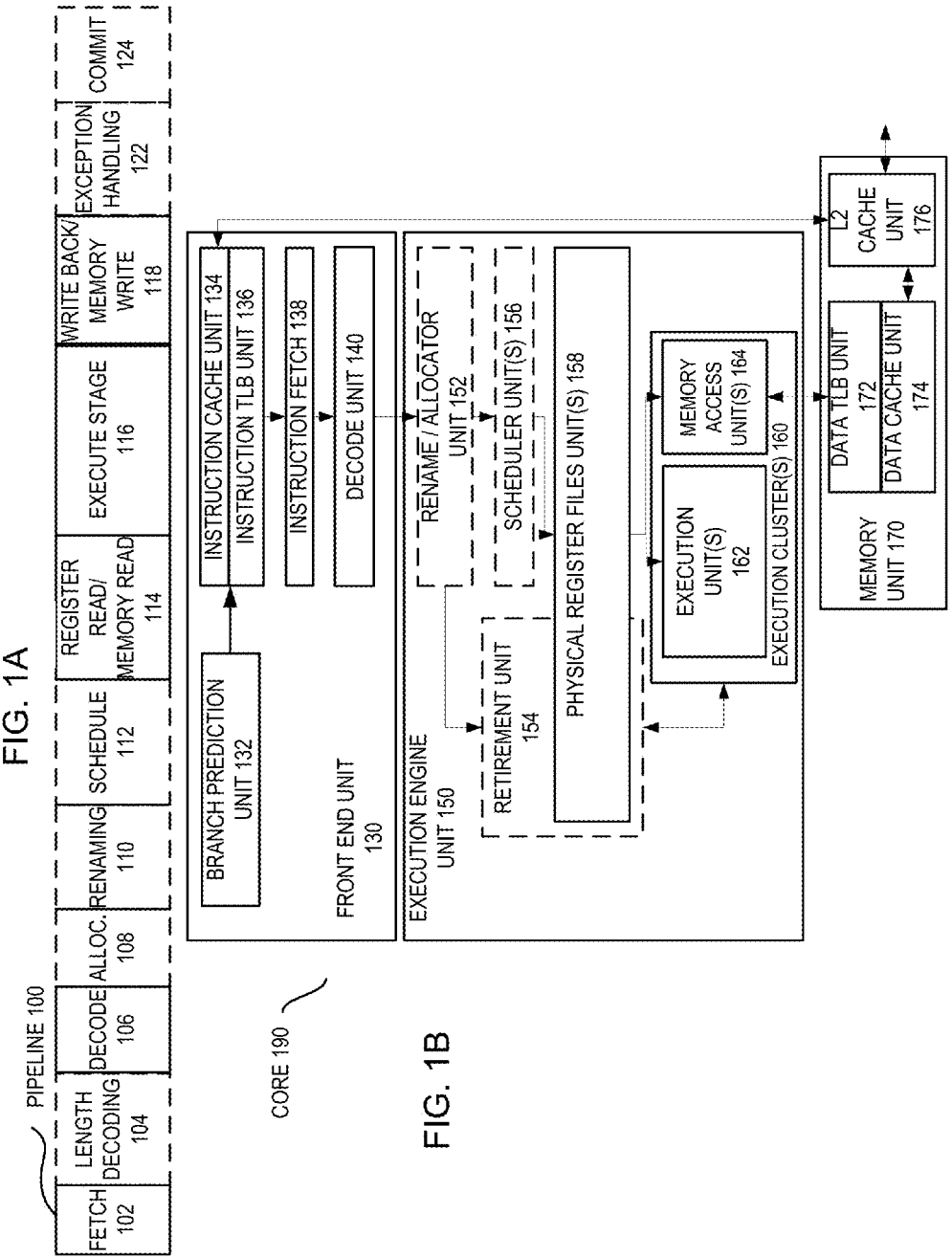
FIG. 1A is a block diagram illustrating both an exemplary in-order pipeline and an exemplary register renaming, out-of-order issue/execution pipeline according to embodiments.
FIG. 1B is a block diagram illustrating both an exemplary embodiment of an in-order architecture core and an exemplary register renaming, out-of-order issue/execution architecture core to be included in a processor according to embodiments.

FIG. 1A is a block diagram illustrating both an exemplary in-order pipeline and an exemplary register renaming, out-of-order issue/execution pipeline according to embodiments. FIG. 1B is a block diagram illustrating both an exemplary embodiment of an in-order architecture core and an exemplary register renaming, out-of-order issue/execution architecture core to be included in a processor according to embodiments. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/ vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
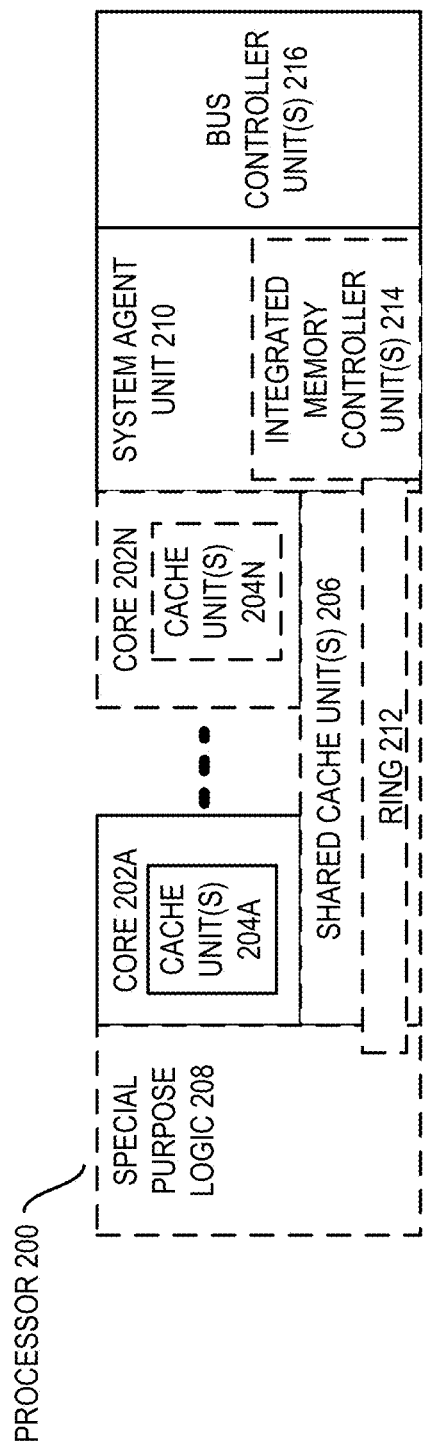
FIG. 2 is a block diagram of a single core processor and a multicore processor with integrated memory controller and graphics according to embodiments.

FIG. 2 is a block diagram of a processor 200 that may have more than one core, may have an integrated memory controller, and may have integrated graphics according to embodiments. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
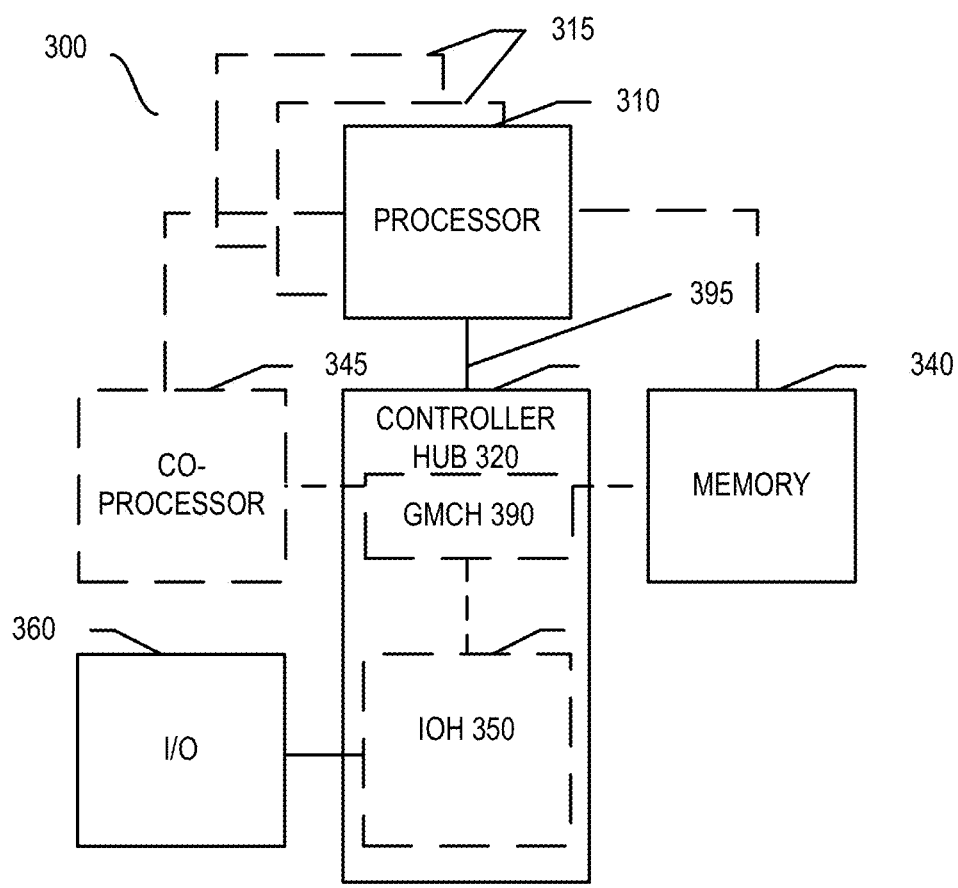
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
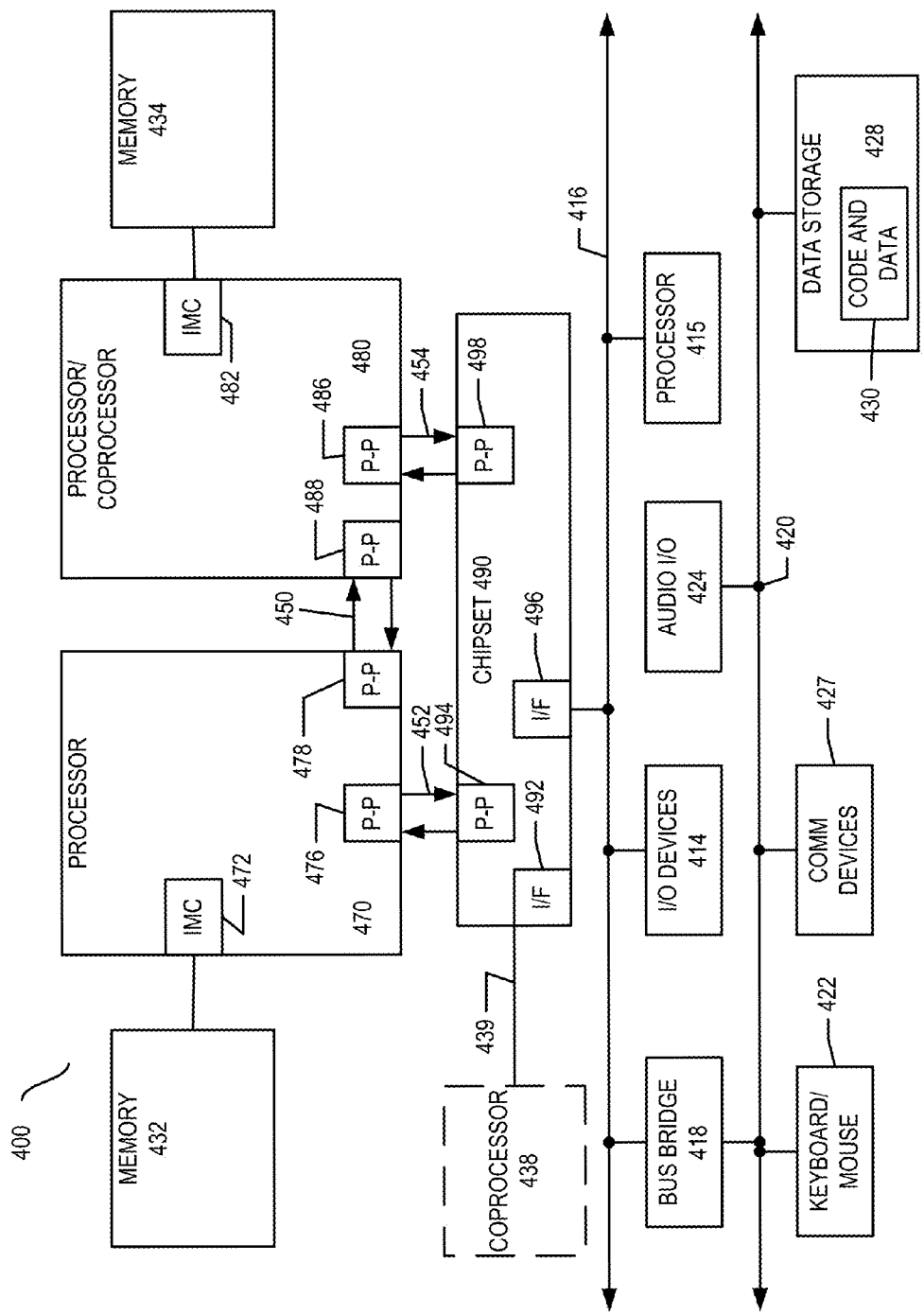
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a pointto-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
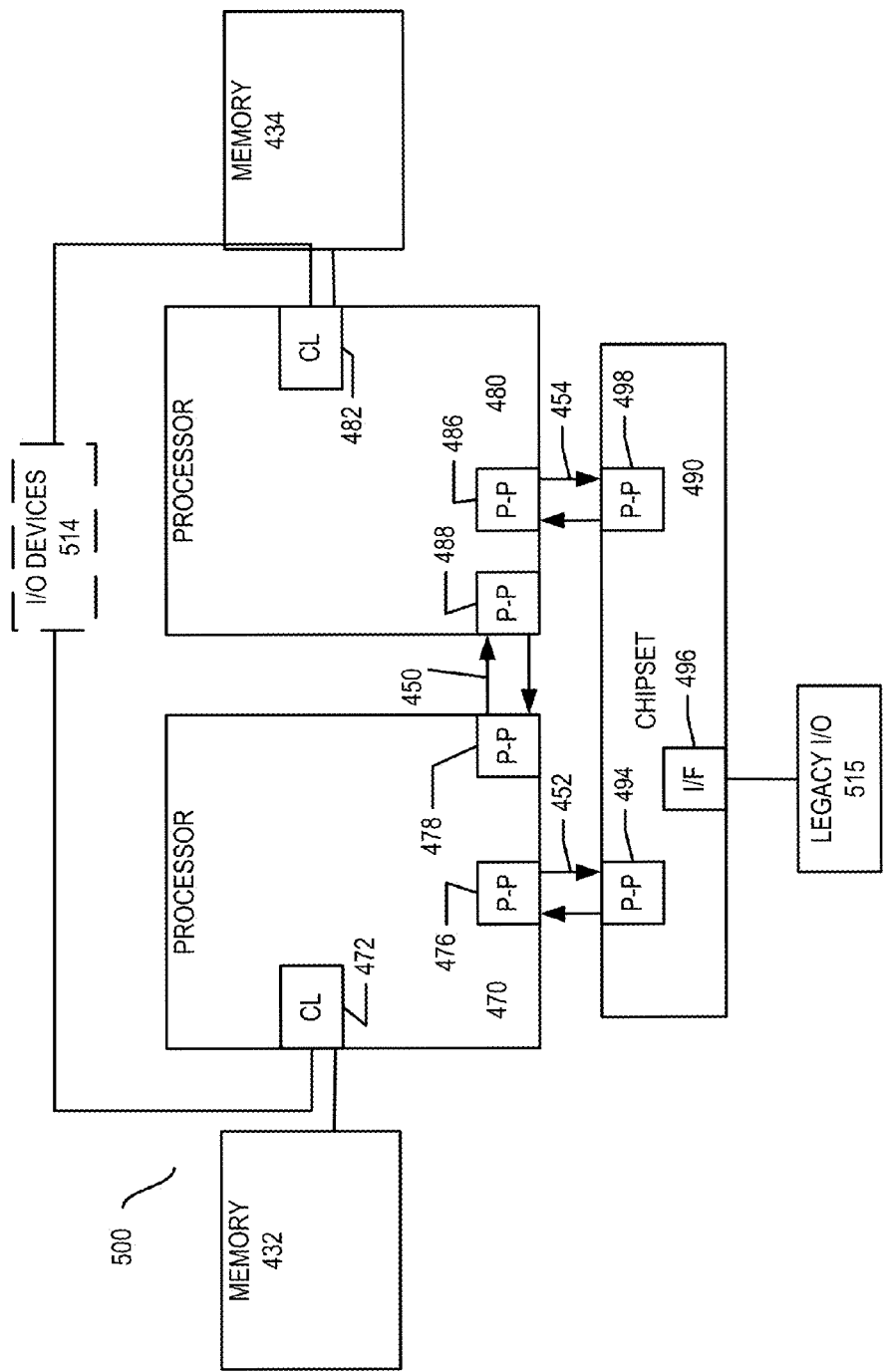
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
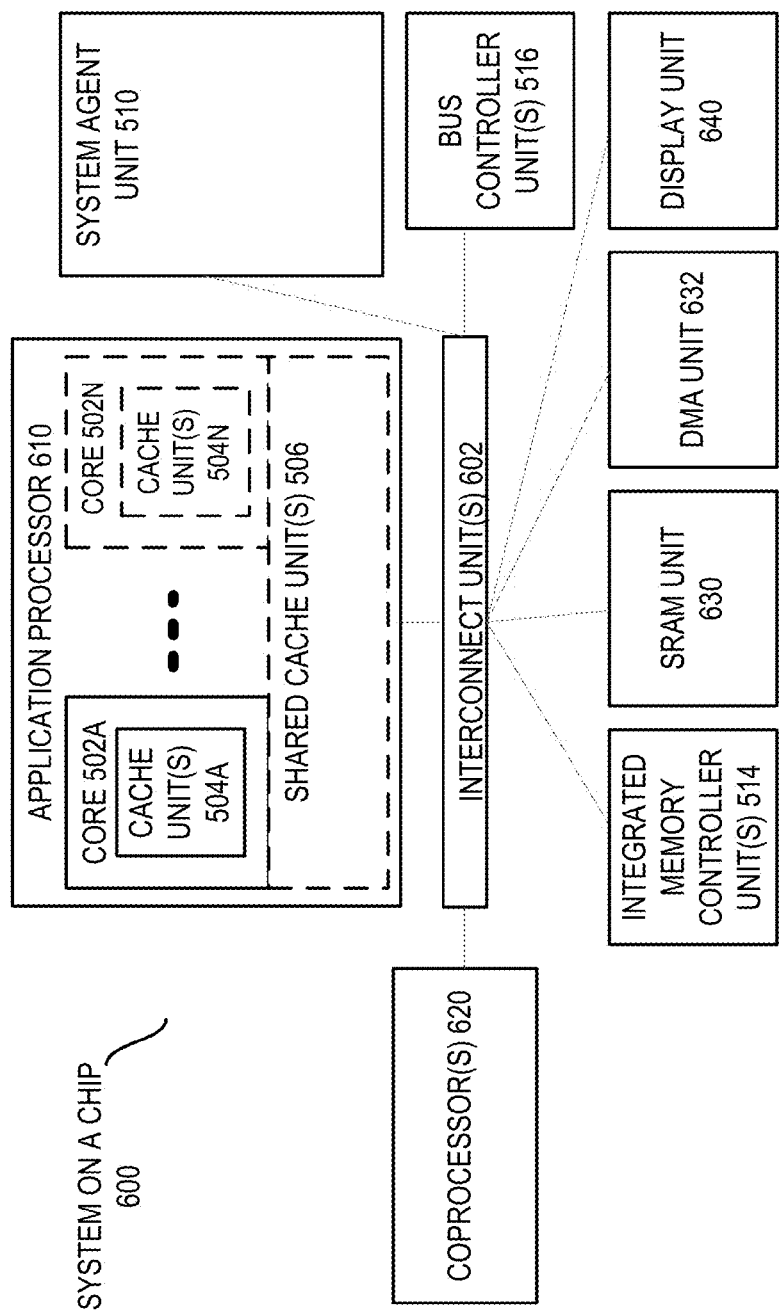
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
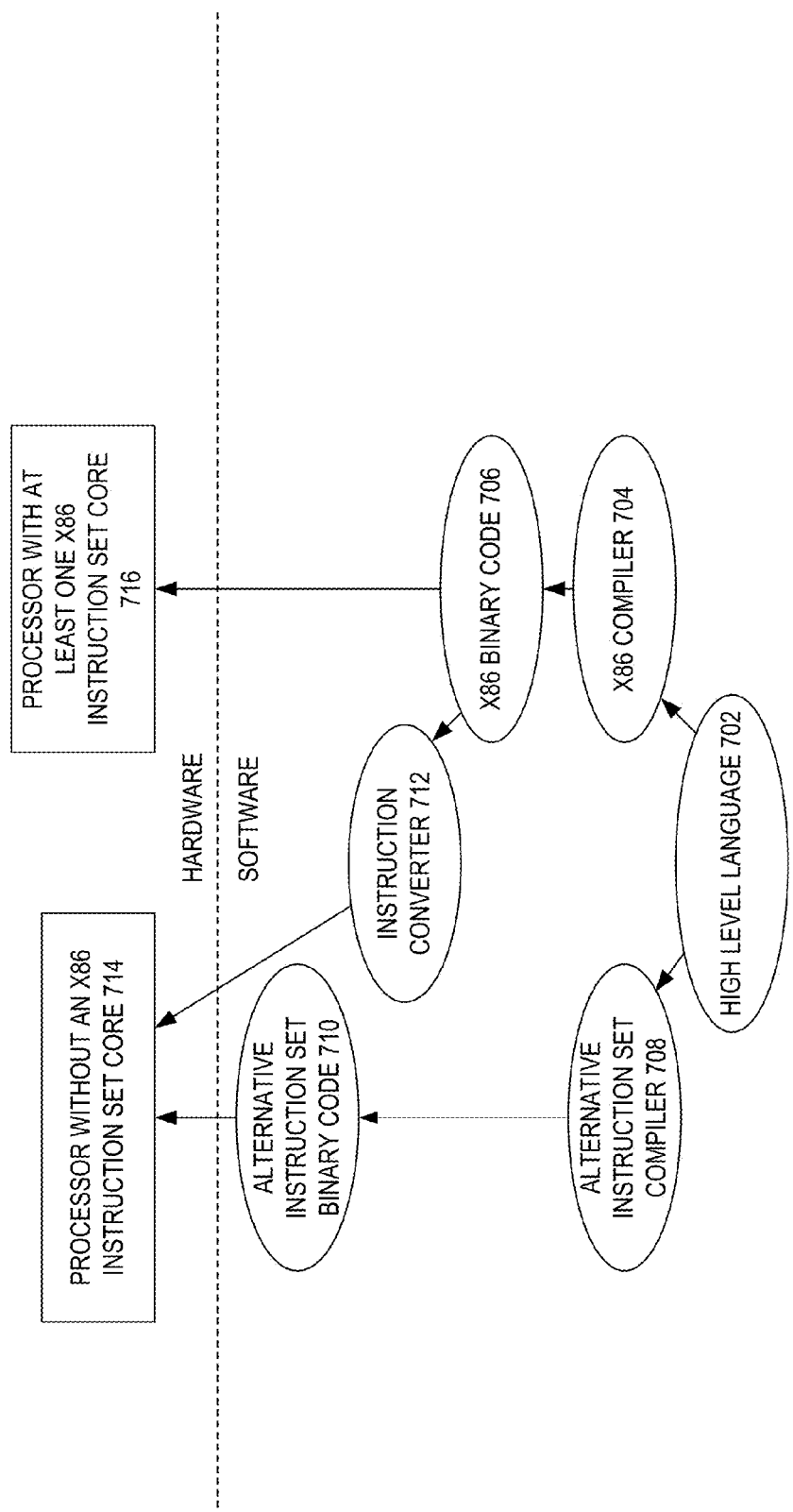
FIG. 7 illustrates a block diagram contrasting the use of a software instruction converter to convert binary instructions in a source instruction set to binary instructions in a target instruction set according to embodiments.

FIG. 7 is a block diagram contrasting the use of a software instruction converter to convert binary instructions in a source instruction set to binary instructions in a target instruction set according to embodiments. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Method and Apparatus for Page Level Monitoring

One embodiment provides a hardware/software co-designed mechanism to detect any change to a memory page and/or to the virtual-physical page mapping. This implementation is beneficial to binary translation systems and is particularly beneficial to a partial translation model. In a partial translation model, guest native execution is mixed with translated code execution. As a result, changes to memory are harder to follow and track as the changes can happen from both native execution and translated execution.

The emergence of multiple processor computing makes the above issues even more challenging. Current systems have yet to solve the multi-processor issues in dealing with the translation consistency violations since multi-processors introduce sophisticated asynchronous occurrences of translation consistency violations by remote processors and DMA devices.

The embodiments described below address the problems mentioned above with an innovative monitor variable concept that may be built with existing hardware units with an extended microcode layer. These embodiments allow binary translated code to check and detect translation consistency violations during runtime using a low-overhead signaling mechanism and solving multi-processor scalability issues.

In particular, one embodiment uses a hardware/software co-designed approach to allow any layer of software to be informed of and to proactively query about a specific page state change such as a virtual-to-physical page mapping consistency, modification of the page, etc., with low cost and no impact to the principle of least privilege employed in layered software design. To enable such low overhead notification mechanisms to software running at lower privilege upon the state change of concerned pages, a signaling mechanism based upon a memory update to a specific memory location, referred to as a "Monitor Variable," is provided. A processor structure called a Page Consistency Look-aside Buffer (PCLB), which provides this page-state-change monitoring mechanism, is also provided.

One embodiment may be employed within a hardware/software co-designed binary translation system to allow lower privileged translated code to query and be notified upon a virtual-to-physical mapping change and self/cross-modifying code occurrences at very low cost. To exhibit the same privilege faulting behaviors and preserve the security isolation of the original code, a translated version of the original code (translated code) needs to be executed at the same privilege as the original code. This notification mechanism should have no impact to the privilege escalation concern as it does not expose any privileged information (such as physical memory address of the requested page, etc) other than informing that such a requested page state change has occurred.

While some embodiments are used in a binary translation system, it should be noted that the underlying principles are applicable to many other uses such as security computing. For example, anti-malware and anti-rootkit software would benefit with the ability to track memory page and page mapping consistency so that malicious writes to unauthorized memory areas can trigger alerts at the earliest possible stage. In general, the embodiments provide ways for the higher privileged trusted security service layer to notify the lower privileged security agent of the requested state change of the given memory location or to allow the lower privilege security agent to query about the memory state change with low overhead.

Figure 8:
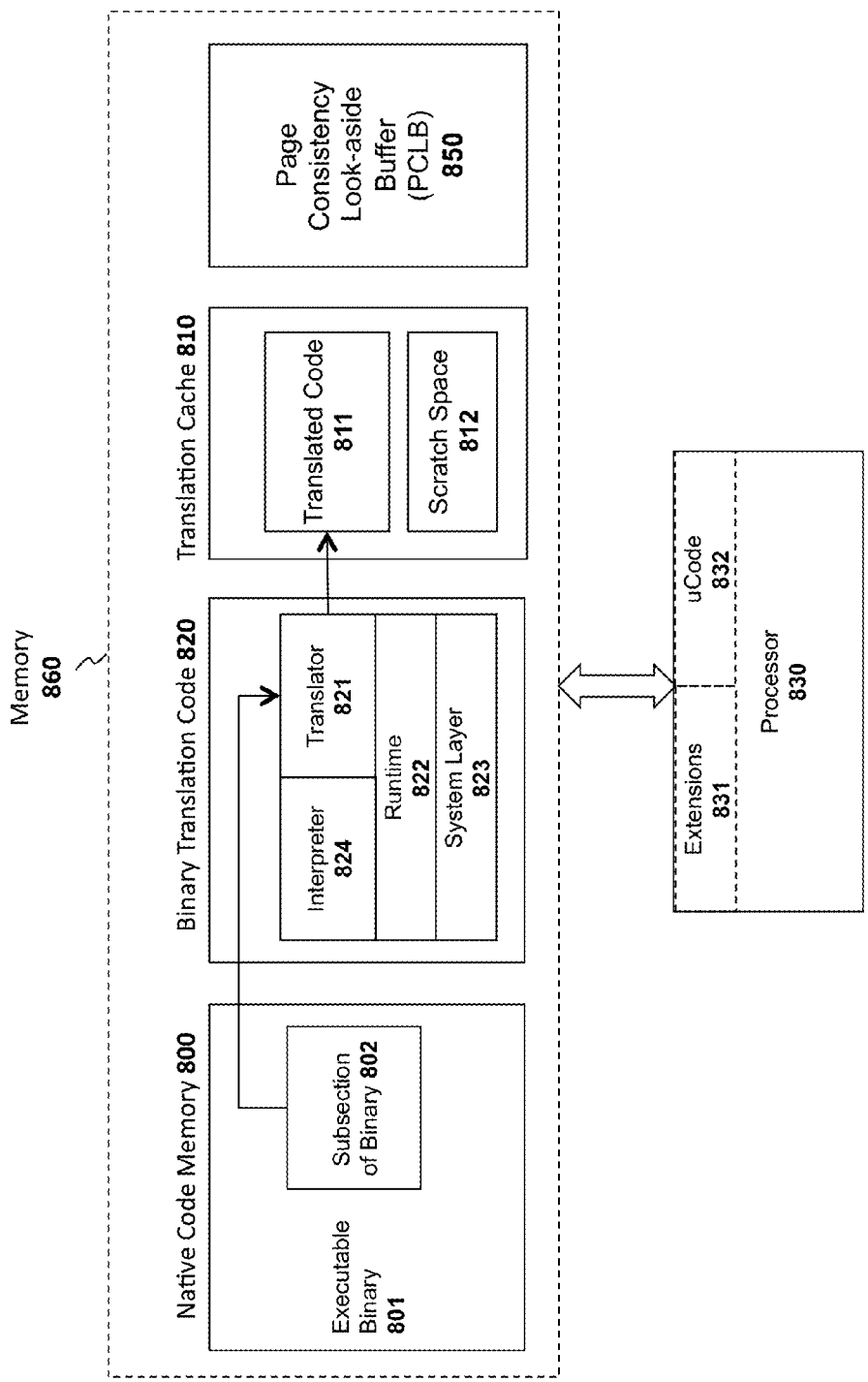
FIG. 8 illustrates one embodiment of an architecture which includes a page consistency look-aside buffer (PCLB)

FIG. 8 illustrates one embodiment of a co-designed hardware and software binary translation system which includes a page consistency look-aside buffer (PCLB) 850 to perform page level monitoring. The system memory 860 includes a native code memory space 800, a translation cache space 810 and binary translation code space 820. The native code memory 800 is the memory space allocated for native software such as the BIOS software, operating system and applications. In one embodiment, the native software comprises x86 program code. However, the underlying principles are not limited to any particular instruction set architecture.

The binary translation code 820 includes a translator component 821 that transforms a subsection 802 of a native executable binary 801 of the native code memory 800 into translated code 811. In one embodiment, the subsection 802 comprises the entire execution binary 801. In one embodiment, the translated code 811 is stored in a translation cache 810, which may be implemented as a dedicated memory space for the translated code 811. In one embodiment, when the translated code 811 executes, it may use a scratch space 812 to store temporary values.

A runtime component 822 (another sub-module of the binary translation code 820) provides runtime services and manages memory allocation and de-allocation for the translation cache 810. The system layer 823 is another sub-module of the binary translation code 820 that handles system-related events such as interrupts, exceptions and dispatches job requests to the rest of the binary translation modules. The interpreter 824 is an optional module employed in one embodiment in the binary translation code 820 that provides direct emulation of the original binary.

In one embodiment, hardware extensions 831 and/or microcode 832 are implemented on the processor 830 to provide hardware support for the various functions described herein. For example, in one embodiment, the hardware extensions 831 and/or microcode 832 execute operations related to the PCLB monitoring and updating techniques and/or the binary translation functions described herein.

Although FIG. 8 shows one translation cache 810 and one processor 830 and one piece of translated code 811, it should be noted that the underlying principles are not so limited. For example, the translation cache 810 can contain several pieces of translated code 811, possibly from different binaries 801. Similarly, it is possible to have several translation caches 810 per processor 830 (e.g., one translation cache 810 per hardware thread). Other embodiments of the invention may be implemented across several processors.

Additionally, different embodiments of the invention may have different configurations of the system RAM 860 and the placement of the translation cache 810 and binary translation code 820. For example, a portion of the system RAM 860 may be embedded inside the processor as embedded DRAM (EDRAM) and a portion of the EDRAM memory storage may be allocated for the translation cache 810 and the binary translation code 820. In some configuration, the scratch space 812 may also be implemented as processor local storage.

In one embodiment, the binary translation software 820 runs in a separate execution container environment from the other software layers including the virtual machine monitor (VMM), operating system and applications. As mentioned above, its job is to translate and generate an optimized version 811 of the original code 802. To exhibit the same privilege faulting behaviors and preserve the security isolation of the original code 802, the translated code 811 needs to be executed with identical modes/privileges as the original code.

In one embodiment, the page consistency look-aside buffer (PCLB) 850 includes a table that is managed by the processor 830 and/or the firmware layer. It is designed to monitor and detect a change in the page consistency for a given list of pages, including virtual-to-physical mappings and page modifications by the processor or DMA devices. In one embodiment, the PCLB 850 exposes an instruction set architecture or firmware interfaces to the binary translation software 820 which uses those interfaces to insert and delete entries to enable/disable page consistency monitoring for concerned pages.

One embodiment includes self modifying code (SMC) protection hardware which enables write-protection to code pages against self-modifying and cross-modifying conditions. This can be built with a dedicated hardware or by utilizing existing resources within the processor 830 such as the existing memory management unit (MMU) including the TLB and IOTLB. To ensure that the translated versions of the original code are valid and not stale, the binary translation system needs to monitor and detect at least two types of page consistency issues: (i) virtual to physical mapping; and (2) self, cross and OMA modifying code conditions. If such a consistency loss occurs, the binary translation software 820 may invalidate the affected translated code 811 and re-translate the original code 802 if necessary. In order for binary translation software to enable page consistency monitoring, the processor 830 or firmware-managed PCLB 850 and insertion/removal/flush interfaces are provided (the details of which are provided below).

As illustrated in FIG. 9, the PCLB table has multiple entries and each entry has multiple fields. The definitions of each field of the PCLB are as follows:

Valid—If set to 1, the entry is currently valid for page consistency monitoring.

V2P (virtual-to-physical) Monitor—If set to 1, virtual-to-physical mapping consistency check is enabled for the current context.

Write Monitor—If set to 1, the SMC/XMC (self modifying code/cross modifying code) monitor is enabled for the given physical page. This can be accomplished by write-protecting the target physical page by the SMC Protection hardware.

Virtual Page Number, Physical Page Number—Virtual Page Number and Physical Page Number fields are used for the PCLB to track virtual-to-physical mapping consistency. Physical page number refers to host physical address when the extended page table (EPT) is enabled. Physical Page Number is also used to enable write-monitoring for the physical address specified with this Physical Page Number field.

Context ID—As virtual-to-physical memory mapping is context (process) specific, Context ID is used to enable virtual-to-physical mapping consistency monitoring only when the given Context ID is currently active. Typical context IDs used by modern operating systems are, for instance, the CR3 register on x86 architecture, or the page table pointer register on a RISC architecture, etc.

Monitor Variable Address—Consists of the memory location in the format of the physical address of the associated Monitor Variable. The processor uses this address to write appropriate values to the monitor variable. A value "TRUE" indicates that the state of the mapping is unchanged. When the page state consistency is lost, a "FALSE" value will be written to the specified Monitor Variable.

ISA Extensions for PCLB Management

The ISA extensions or the firmware interfaces to manage the PCLB for INSERT, REMOVE and FLUSH operations may be provided to the binary translation software 820. As previously discussed, the processor may include hardware support for these operations with hardware extensions 831 and/or microcode (uCode) 832. There may be different implementations of the PCLB table 850. For instance, the PCLB 850 may be implemented with a dedicated hardware for monitoring both virtual-to-physical mapping consistency and SMC/XMC detection. In another instance, the PCLB features may be implemented through extended microcode or firmware by utilizing the existing processor MMU/IOMMU units such as the TLB for substituting SMC Protection Hardware to detect SMC/XMC conditions. In another embodiment, the PCLB functionality may be implemented by the VMM software layer when binary translation software 820 is part of the VMM managed software components.

Structurally, the PCLB 850 could be built as a direct-mapped table, N-way associative or fully associative table. The number of PCLB entries may be determined based on variables such as the size of the binary translation cache 810, the performance requirements of the system, and the capacity limitation of the structure itself. Overall, the PCLB implementation depends on the specific processor and firmware implementation which determines what and how the interfaces are exposed to the binary translation software 820 via the ISA extension.

Enabling Page Consistency Monitoring

As virtual to physical mapping needs to be tracked on a context (e.g., process) basis, each PCLB entry has a Context ID field. By way of example, and not limitation, in Intel 64 and IA-32 processors, the Context ID value can be created from the CR3 (control register 3) and EPT (extended page table) root values. The Virtual Page Number and Physical Page Number fields are used to track the virtual-to-physical mapping consistency for the given Context ID.

Figure 10:
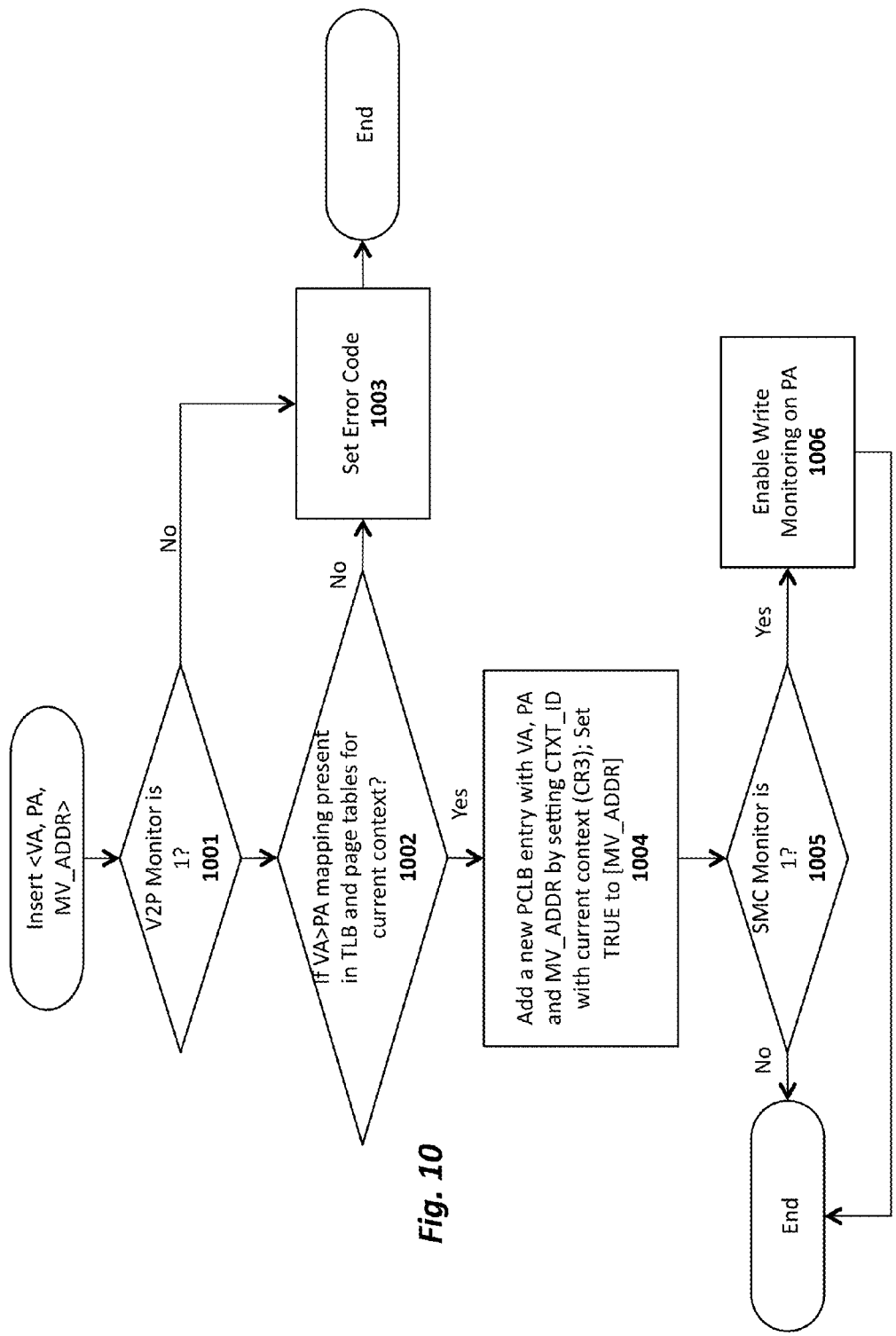
FIGS. 10-13 illustrate different methods for updating a PCLB.

FIG. 10 illustrates one embodiment of an insertion operation for inserting a new entry into the insertion of a new Context ID for a current context into the PCLB 850. At 1001, a determination is made as to whether virtual-to-physical mapping consistency check is enabled for the current context. If not, then an error is generated at 1003 and the process terminates.

If so, then at 1002, a determination is made as to whether a virtual-to-physical mapping is present in the translation lookaside buffer (TLB) and page tables of the processor for the current context. If not, then an error code is generated at 1003. If so, then at 1004, a new PCLB entry is added for the current context (identified via CR3) using the virtual address, physical address, and monitor variable address (MV_ADDR) which, as discussed above comprises the physical address of the associated Monitor Variable. The processor uses this address to write a value of "TRUE" indicating that the state of the mapping is unchanged (or, in this case, new).

If the self-modifying code (SMC) monitor value is set to 1, determined at 1005, then write monitoring is enabled on the physical address for the current context at 1006. If the SMC monitor value is set to 0, then the process terminates.

Figure 11:

In one embodiment, in order for the PCLB to track virtual-to-physical mapping consistency per context (process address space), the address space switch operation by the operating system such as the MOV to CR3 operation is intercepted and the method illustrated in FIG. 11 is employed to re-validate the PCLB entries with the new context's address space.

A new context is moved to CR3 at 1101. At 1102, the process begins with the first PCLB entry slot. If the context ID of the slot identifies the old context (i.e., the context just prior to the move to the new context), determined at 1103, then at 1106, a FALSE value is written to the monitor variable address indicating that the state of the mapping has changed. The next PCLB entry slot is selected at 1109 and if the current slot is not the final slot (determined at 1110), then the process returns to 1103.

If the context ID of the slot does not identify the old context at 1103, then at 1104, a determination is made as to whether the context ID identifies the new context (i.e., the context moved into CR3). If not, then the next PCLB entry slot is selected at 1109 and if the current slot is not the final slot (determined at 1110), then the process returns to 1103. If the context ID identifies the new context, and if the virtual-to-physical mapping for the context is present in the TLB and/or page tables, determined at 1107, then at 1108 a TRUE value is written to the monitor variable address indicating that the current state of the mapping is unchanged. In any case, the process returns to the next slot at 1109 and repeats if the slot is not the last slot, determined at 1110. In order to support the memory virtualization scenario, the same flow above may be invoked whenever the EPT root is switched.

Thus, to re-validate the PCLB entries upon context switch, the PCLB needs to scan the entries, compare the CTXT field with the new Context and re-validate virtual-to-physical mapping by checking the TLB or the page table structures of the new context and setting a TRUE or FALSE value to the Monitor Variable memory location depending on the result of each validation. Notification of virtual to physical mapping loss by a context switch will be communicated to binary translation software by writing a FALSE value to the Monitor Variable memory location specified by PCLB Monitor Variable Address field. The PCLB entries that have the matching context value to the new CTXT_ID are revived again if the same virtual-to-physical mapping is found in the TLS or the page table structures for the new context's address space. When reviving a PCLB entry, the Monitor Variable memory location specified by the PCLB Monitor Variable Address field is written with a TRUE value.

Removal and Invalidation of PCLB Entries

Figure 12:
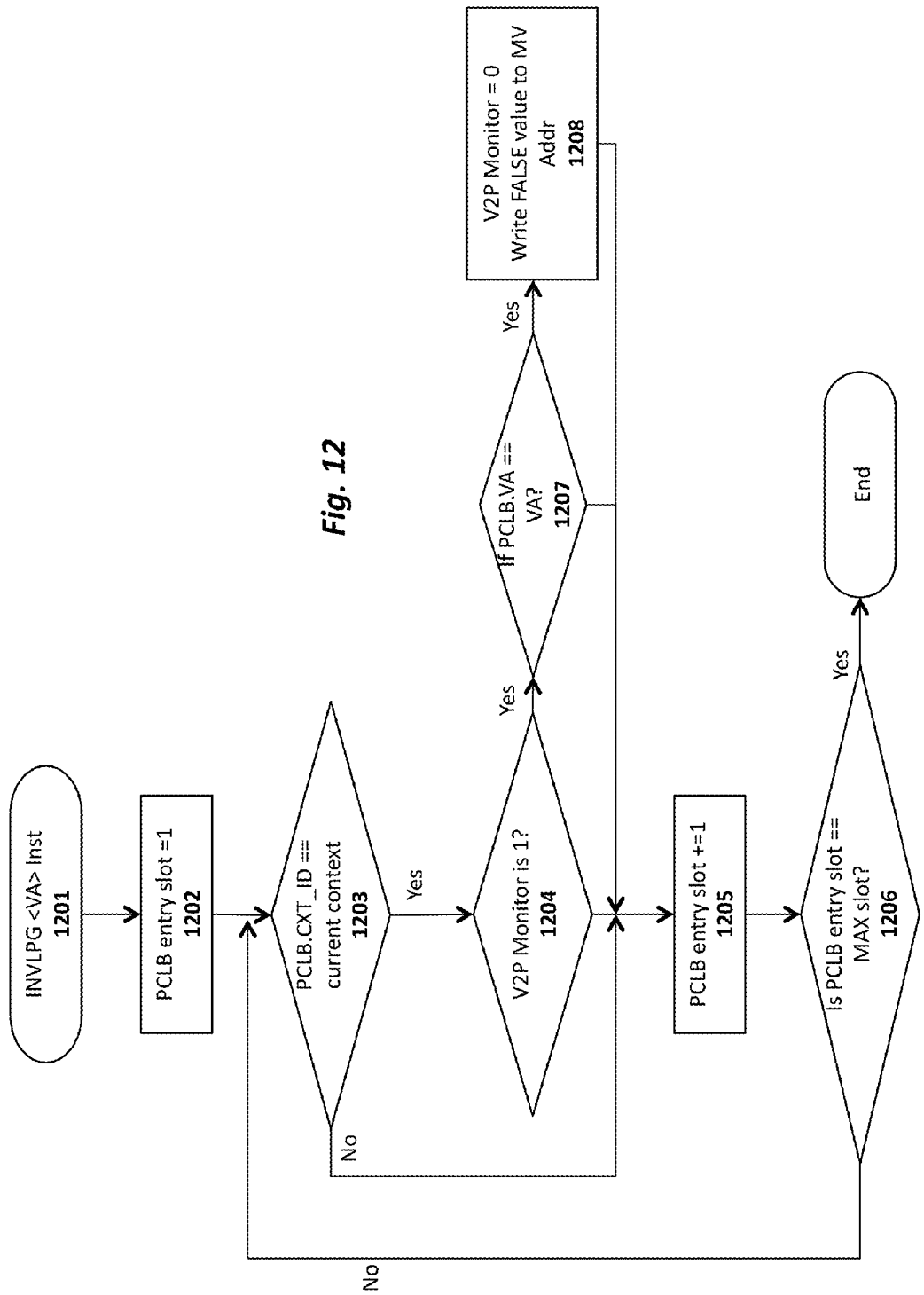

To allow the PCLB to detect the loss of virtual-to-physical mapping upon OS and VMM page remapping operation, the PCLB needs to implement the following process for the TLB entry flush operation. An exemplary PCLB flow for an invalidate (INVLPG) instruction is shown in FIG. 12. At 1201, the INVLPG instruction is initiated using a particular virtual address. The process starts with the first PCLB slot entry at 1202. If the context ID of the PCLB entry is equal to the current context, determined at 1203, then at 1204, a determination is made as to whether the virtual-to-physical monitor field is set to 1. If so, then at 1207 the virtual address of the PCLB entry is compared to the virtual address associated with the INVLPG instruction. If there is a match, then at 1208 the virtual-to-physical monitor field is set to 0 and a value of FALSE is written to the monitor variable address. At 1205, the next PCLB slot entry is selected and, if the final one, determined at 1206, the process terminates. If not the final one, then the process returns to 1203.

Thus, the matching PCLB entries having the same Virtual Page Number are invalidated. When a matching occurs, a loss of the virtual-to-physical consistency is notified by writing a FALSE value to the memory location specified by the PCLB Monitor Variable Address field. The PCLB entry removal operation by binary translation software can be done with the same PCLB flow as the INVLPG case since the Virtual Page Number can also be used for the PCLB removal operation to select which PCLB entry to remove.

In one embodiment, the FLUSH operation, which invalidates the entire PCLB, can be implemented by unconditionally invalidating all the PCLB entries and updating each Monitor Variable memory location of the invalidated PCLB entry with a FALSE value.

Figure 13:
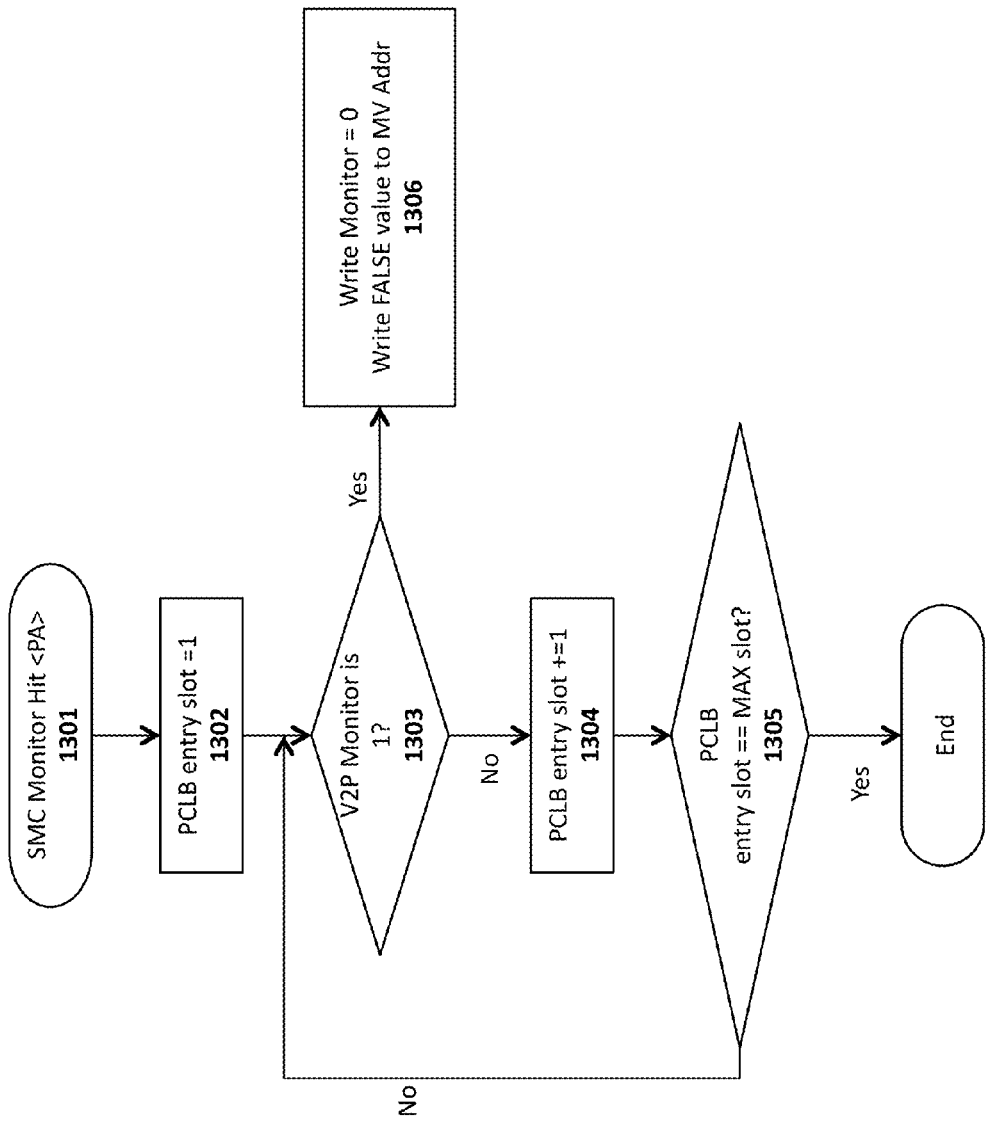

When the SMC monitoring is enabled, the SMC protection hardware enables write-protection for the target physical page. In one embodiment, when a write occurs to the SMC-protected page, the processor is notified and the process illustrated in FIG. 13 is implemented for the PCLB to detect and signal the occurrence of SMC/XMC condition by writing a FALSE value to the Monitor Variable of the affected PCLB entry. At 1301 at SMC monitor hit condition is detected and at 1302, the first PCLB entry slot is selected. If the virtual-to-physical monitor field is set to 1, then at 1306, the write monitor field is set to 0 and a value of FALSE is written to the monitor variable address. The next PCLB entry slot is selected at 1304 and, if not the last entry slot (determined at 1305), the process loops back to 1303.

Multi-Processor Support

When two separate threads have the same virtual-to-physical mapping and run on separate processors, two separate PCLB entries need to be allocated in order for each thread to individually track and monitor the validity of the virtual-to-physical mapping for its own context on each separate processor. In order to support these multi-processor scenarios, the PCLB table may be allocated per logical processor. For example, a logical processor ID may be added to the PCLB entry if the PCLB is built as a global shared resource.

However, this creates interesting issues related to thread migration. Suppose that a thread is monitoring the page consistency for the virtual address 0x5000 with the Monitor Variable A. When this thread migrates to another processor, the location of the Monitor-Variable referred by this thread needs to change for the aforementioned reason. The problem is that it may not be easy for the software itself such as the application thread to know and use a different Monitored Variable location depending upon which logical processor it is currently running on. One solution is to use an address aliasing technique to map the Monitor Variable to a different physical page on each logical processor but with the same virtual address. This technique allows the program that accesses the Monitor Variable to freely migrate from one processor to another without changing the address of the Monitor Variable to track the page consistency state of the particular page.

Monitor Variable Memory Software Management and Usages

Figure 14:
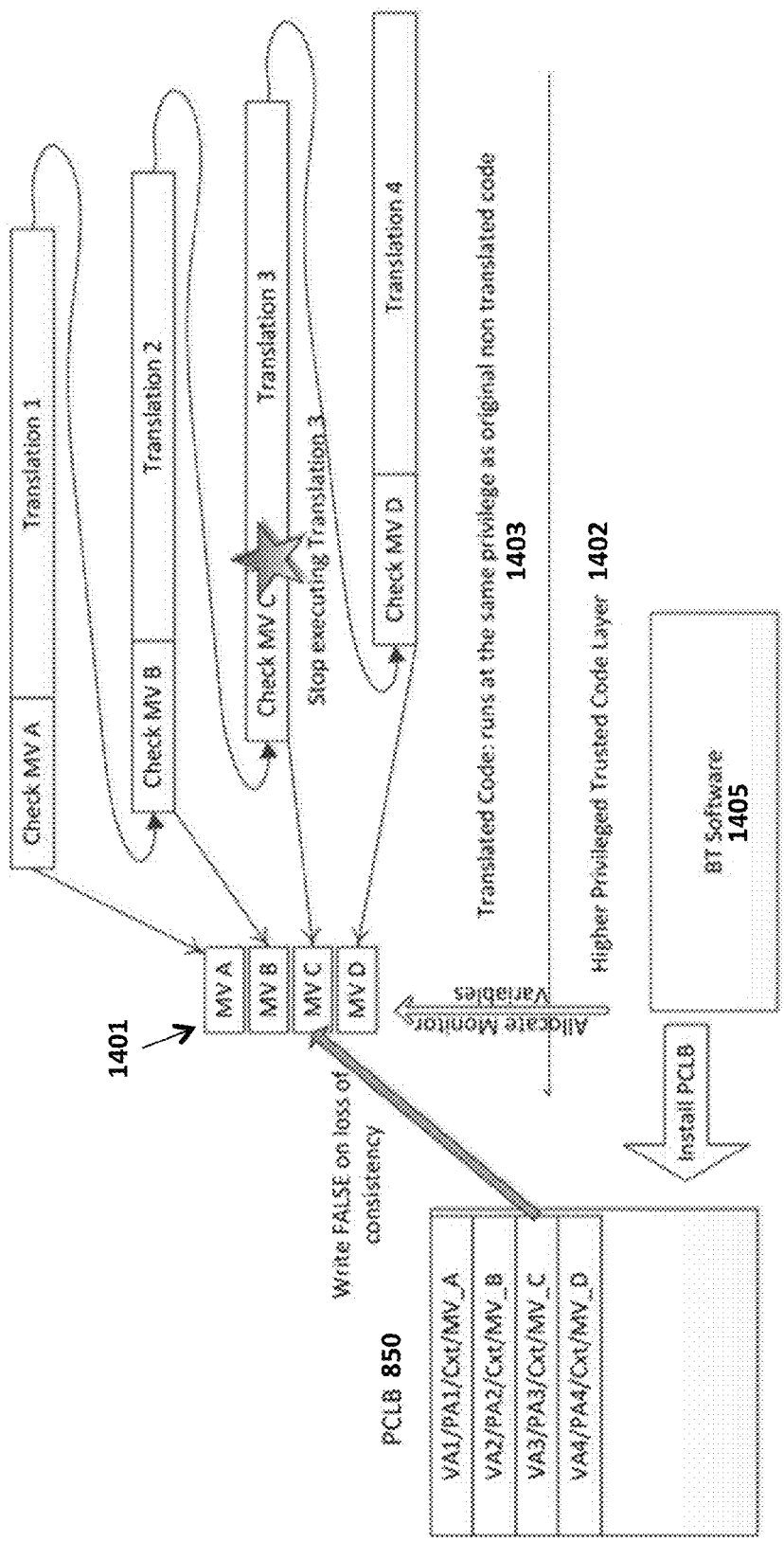
FIG. 14 illustrates updating and using monitor variables in accordance with one embodiment.

As illustrated generally in FIG. 14, for each virtual to physical page mapping for which software needs to track consistency, one monitor variable 1401, a unique memory address location which is accessible from the low-privilege software component 1403 (a consumer of Monitor Variable), may be allocated by the trusted higher-privileged software layer 1402. For the hardware/software co-designed binary translation system, the allocation of the monitor variables 1401 may be done by the binary translation software 1405 (e.g., allocated from concealed memory transparent to the OS). The consumer of the monitor variable, which runs at a lower privilege, is the translated version of the original code (illustrated as Translation 1-4 in FIG. 14) which runs at the same privilege as the original version of the binaries. When the translated version of the original code is generated, the binary translation software is responsible for: (1) enabling the page consistency monitoring for the original code page through PCLB 850; (2) allocating the memory space for the Monitor Variables 1401; (3) making the Monitor Variables 1401 accessible from the translated version of original code.

In the case of page mapping being changed, the OS either issues the INVLPG instruction to invalidate the corresponding TLS entry (this usually happens when single page is remapped) or to change the page table base pointer (e.g., the value of CR3 register on the x86 architecture). In either case, the processor should be able to detect the change and search the entire PCLB table to invalidate impacted entries. Similarly, the processor is able to detect SMC/XMC conditions with help from the SMC/XMC Protection Hardware and search the PCLB lookup table 850 to invalidate impacted entries. As illustrated, the correlated Monitor Variables 1401 are written with FALSE values to indicate the change.

As the translated version of the binary (e.g., Translation 1-4) has embedded code to check the value of the Monitor Variable 1401 prior to executing the translation from the code page which the Monitor Variable corresponds to, the execution of the translated code will stop by itself if the value is read FALSE (i.e. the target page has been affected). Notification of the page consistency loss events is done through simply updating the monitor variable 1401 allocated for the given page that is to be monitored. By checking the monitor variable with simply a memory compare operation, the translated code is able to know whether a change has happened or not. This is a low cost solution as no new instruction extensions are needed to monitor the loss of the page consistency from the translated code.

As said, the details of PCLB structure and the detailed field entry information are not visible to the translated code itself. The translated code does not even need to know what physical address this virtual address is mapped to. From the functional requirement standpoint, the translated code simply needs to know if the consistency is lost for this translation prior to executing the translation and if so it needs to stop executing it. This is exactly provided by monitor variables and the PCLB mechanism. Thus, monitor variables and the PCLB mechanism can enable the least privileged principle of the layered software design and improve the security of the BT Software system.

SUMMARY

Though this Binary Translation usage of this invention monitors only virtual-to-physical mapping change and SMC/XMC detection, the PCLB table structure and its concept can be extended to monitor not only write but also read and execution activities to the pages. In particular, this type of extensions may be useful for the potential security usages of this invention. Though the current design prefers using a single monitor variable for reflecting the change in any page consistency, it is also possible to extend the PCLB entry field to allocate separate monitor variable fields for each reflecting the different type of page consistency violations such as virtual-to-physical mapping consistency and write detections. The number of monitor variable required is up to how many monitor sources the software system is in need. The guideline here is, for each page to be monitored in the software execution entity, at least one dedicated monitor variable must be allocated to activate consistency monitoring via the PCLB.

In one embodiment, the PCLB table does not have to be large enough to retain all the old entries. Due to the capacity limitation, the PCLB table may not be able to hold all the requests coming from the software side. In the case when PCLB tab le reaches its size limit, the new coming requests can only be fulfilled after PCLB control logic removes some of the old entries from the table. The detailed replacement policy is flexible for different implementation hence is not covered by this disclosure. But no matter what kind of implementation is in place, it is crucial for the processor to invalidate the value of the associated monitor variable of the replaced PCLB entry. Simply speaking, false alarm may happen to any page, but they can be correctable by the software by re-enabling protection via PCLB.

In summary, monitor variables and the PCLB offer an inexpensive hardware/software codesigned approach to replace current hardware-only solutions. It does not require exposing the host physical address of the given virtual address to the translated code, even if the execution is in the translated code rendered by the binary translation software. This significantly reduces the security risk of the translated code as it lowers the privileges exposed to the translated code. A variance of these PCLB techniques can also be used to define the application level ISA extensions to help application level BT to enable SMC detection.

Embodiments may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A method for monitoring memory pages comprising:
storing, in a data structure for each of a plurality of memory pages, information including a context identifier and an address identifying a monitor variable location, the data structure being directly accessible only by a software layer operating above a privilege level being operated by a program code;
detecting virtual-to-physical page mapping consistency changes or other page modifications to a particular memory page for which information is maintained in the data structure;
responsively performing monitor variable update to reflect the virtual-to-physical page mapping consistency changes or page modifications based on context identifier match;
prior to execution of the program code, checking a monitor variable, location of which is identified by the data structure, the monitor variable being associated with a memory page; and
refraining from executing the program code if the monitor variable indicates consistency changes or page modifications to the memory page.

2. The method as in claim 1 wherein if the monitor variable does not indicate consistency changes or page modifications, then executing the program code.

3. The method as in claim 1 wherein the program code comprises translated binary code.

4. The method as in claim 1 wherein the data structure comprises a table with a separate row for each memory page.

5. The method as in claim 4 wherein a value of the monitor variable comprises a Boolean data type with a FALSE value indicating consistency changes or page modifications.

6. The method as in claim 1 further comprising:
determining whether a virtual to physical mapping is present in a translation lookaside buffer and/or a page table for a current context; and
adding a new entry for a new memory page in the data structure only if a virtual to physical mapping is present in the translation lookaside buffer and/or the page table for the current context.

7. The method as in claim 1 further comprising:
re-validating entries for memory pages in the data structure within a new context's address space responsive to an address space switch operation.

8. The method as in claim 1 further comprising:
invalidating one or more entries in the data structure in response to a flush of a corresponding entry in a translation lookaside buffer (TLB).

9. The method as in claim 8 wherein invalidating comprises identifying the one or more entries using a virtual address associated with the flush.

10. A processor comprising:
first logic to store, in a data structure for each of a plurality of memory pages, information including a context identifier and an address identifying a monitor variable location, the data structure being accessible only by a software layer operating at or above a privilege level being operated by a program code;
second logic to detect virtual-to-physical page mapping consistency changes or other page modifications to a particular memory page for which information is maintained in the data structure;
third logic to responsively perform monitor variable update to reflect the virtual-to-physical page mapping consistency changes or page modifications based on context identifier match; and fourth logic to:

prior to execution of the program code, check a monitor variable, location of which is identified by the data structure, the monitor variable being associated with a memory page, and refrain from executing the program code if the monitor variable indicates consistency changes or page modifications to the memory page.

11. The processor as in claim 10 wherein if the monitor variable does not indicate consistency changes or page modifications, then executing the program code.

12. The processor as in claim 10 wherein the program code comprises translated binary code.

13. The processor as in claim 10 wherein the data structure comprises a table with a separate row for each memory page.

14. The processor as in claim 13 wherein a value of the monitor variable comprises a Boolean data type with a FALSE value indicating consistency changes or page modifications.

15. The processor as in claim 10 further comprising:

fifth logic to add a new entry for a new memory page in the data structure only if a virtual to physical mapping is present in a translation lookaside buffer (TLB) and/or a page table for a current context.

16. The processor as in claim 10 further comprising:

fifth logic to re-validate entries for memory pages in the data structure within a new context's address space responsive to an address space switch operation.

17. The processor as in claim 10 further comprising:

fifth logic to invalidate one or more entries in the data structure in response to a flush of a corresponding entry in a translation lookaside buffer (TLB).

18. The processor as in claim 17 wherein invalidating comprises identifying the one or more entries using a virtual address associated with the flush.

* * * * *